(12) United States Patent
Lyle et al.

(10) Patent No.: US 8,943,149 B2
(45) Date of Patent: Jan. 27, 2015

(54) SENDER MOTIVATED OPTIMIZATION OF URI RENDERING IN INSTANT MESSAGING

(75) Inventors: Ruthie D. Lyle, Durham, NC (US);
Patrick J. O'Sullivan, Ballsbridge (IE);
Fred Raguillat, Meath (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 13/108,157

(22) Filed: May 16, 2011

(65) Prior Publication Data

US 2012/0296954 A1 Nov. 22, 2012

(51) Int. Cl.
*G06F 15/16* (2006.01)
*H04L 12/58* (2006.01)

(52) U.S. Cl.
CPC ............... *H04L 51/04* (2013.01); *H04L 51/18* (2013.01); *H04L 51/08* (2013.01)
USPC ........................................................ 709/206

(58) Field of Classification Search
CPC .................. H04L 29/08549; H04L 29/08072; H04L 29/06; H04L 29/08144; H04L 29/12066; H04L 61/1511; H04L 12/1813; H04L 12/2496; H04L 12/581
USPC ......... 709/212, 224, 226, 229, 245, 204, 205, 709/206, 207
See application file for complete search history.

(56) References Cited

U.S. PATENT DOCUMENTS

| | | | | |
|---|---|---|---|---|
| 5,961,603 A * | 10/1999 | Kunkel et al. | ................. | 709/229 |
| 6,098,096 A * | 8/2000 | Tsirigotis et al. | ............. | 709/213 |
| 6,678,720 B1 | 1/2004 | Matsumoto et al. | | |
| 7,305,610 B1 * | 12/2007 | Dean et al. | ..................... | 715/205 |
| 7,747,749 B1 * | 6/2010 | Erikson et al. | ................ | 709/226 |
| 8,271,574 B1 * | 9/2012 | Srinivasan et al. | ............ | 709/201 |
| 2006/0033945 A1 * | 2/2006 | McDonald et al. | .......... | 358/1.13 |
| 2006/0048049 A1 * | 3/2006 | Sholl | ............................. | 715/513 |
| 2006/0167841 A1 * | 7/2006 | Allan et al. | ....................... | 707/3 |
| 2007/0038715 A1 * | 2/2007 | Collins et al. | ................. | 709/206 |
| 2009/0113378 A1 * | 4/2009 | Boyer et al. | .................. | 717/101 |
| 2009/0150499 A1 * | 6/2009 | Partridge et al. | .............. | 709/206 |
| 2009/0259932 A1 * | 10/2009 | Bank et al. | ..................... | 715/229 |
| 2010/0094976 A1 | 4/2010 | Kanefsky et al. | | |
| 2010/0281224 A1 * | 11/2010 | Ho et al. | ......................... | 711/137 |
| 2011/0078251 A1 * | 3/2011 | Cross et al. | ................... | 709/206 |
| 2011/0087730 A1 * | 4/2011 | Li et al. | ......................... | 709/203 |

* cited by examiner

*Primary Examiner* — Ricky Ngo
*Assistant Examiner* — Kabir Jahangir
(74) *Attorney, Agent, or Firm* — Cuenot, Forsythe & Kim, LLC (57) ABSTRACT

Rendering content identified by a uniform resource identifier (URI). One embodiment can include, within a first communication device comprising a processor and a memory, on the first communication device, receiving the URI within an instant messaging (IM) session. The method further can include, via the processor, prior to receiving a user input selecting the URI, attempting to retrieve content from a content source identified by the URI to preload the content within the memory.

23 Claims, 4 Drawing Sheets

SENDER MOTIVATED OPTIMIZATION OF URI RENDERING IN INSTANT MESSAGING

BACKGROUND

The embodiments disclosed within this specification relate to electronic messaging systems. More particularly, the embodiments relate to instant messaging (IM).

IM is a form of real-time text-based communication between two or more people using personal computers or other communication devices. Typically, an IM client is executed on each of the communication devices, and an IM session is established. Within the IM session, users can communicate text messages to one another over a network, such as the Internet or another wide area network (WAN), a local area network (LAN), etc. More advanced IM clients also allow enhanced modes of communication, such as live voice or video calling.

BRIEF SUMMARY

The embodiments disclosed within this specification relate to electronic messaging systems and, more particularly, to rendering content identified by a uniform resource identifier (URI). One embodiment of the present invention can include, within a first communication device comprising a processor and a memory, on the first communication device, receiving the URI within an instant messaging (IM) session. The method further can include, prior to receiving a user input selecting the URI, via the processor, attempting to retrieve content from a content source identified by the URI to preload the content within the memory.

Another embodiment of the present invention can include, within a first communication device comprising a processor and a memory, on the first communication device, receiving the URI from a first user as a text input to an instant message within an instant messaging (IM) session. The method further can include, prior to receiving a user input selecting to send the instant message, via the processor, communicating a hidden message containing the URI to at least a second communication device, wherein the hidden message is configured to indicate that content from a content source identified by the URI is to be preloaded within the memory.

Yet another embodiment of the present invention can include a computer program product including a computer-readable storage medium having computer-usable program code that, when executed, causes a machine to perform the various steps and/or functions described herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (anon-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber storage medium, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RE, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to rendering content identified by a uniform resource identifier (URI) received during an instant messaging (IM) session. More particularly, when a first user within an IM session enters a URI, the URI can be communicated to one or other users participating in the IM session, even before the first user sends the instant message into which the URI is entered. For example, the URI can be sent to the other users in a hidden message received by the IM clients of the other users. As used herein, a hidden message is a message that is processed by a communication device, but not typically presented to a user when the message is received. For example, if a user profile is configured not to present the hidden message, for example via a default setting, the hidden message will not be presented to the user when the hidden message is received. If, however, the user profile is configured to present to the user hidden messages that are received, the hidden message can be presented to the user when received, though this typically will not be the case.

In response to receiving the URI, the IM clients can attempt to retrieve content from a content source identified by the URI to preload the content within the memory. If the URI is a valid link, the IM clients can download the content, even before the instant message containing the URI is received. The content can be preloaded within memory, for instance on the communication devices via which the IM clients are executing or other memory communicatively linked to such communication devices, and made to be available to be presented to the other users immediately (e.g., in real time) upon the users receiving the instant message and/or selecting the URI within the instant message. Since retrieval of the content begins before the instant message is received, and is pre-loaded into the memory, when the instant message is received or a user selects the URI from the instant message, the content can be presented to the user significantly faster than if the content was not pre-loaded into memory. As used herein, a URI can be a uniform resource locator (URL), a uniform resource name (URN), or any other identifier that indicates a location of content that may be presented on a communication device. URIs are well known to the those skilled in the art. As used herein, the term "real time" means a level of processing responsiveness that a user or system senses as sufficiently immediate for a particular process or determination to be made, or that enables the processor to keep up with some external process.

Figure 1:
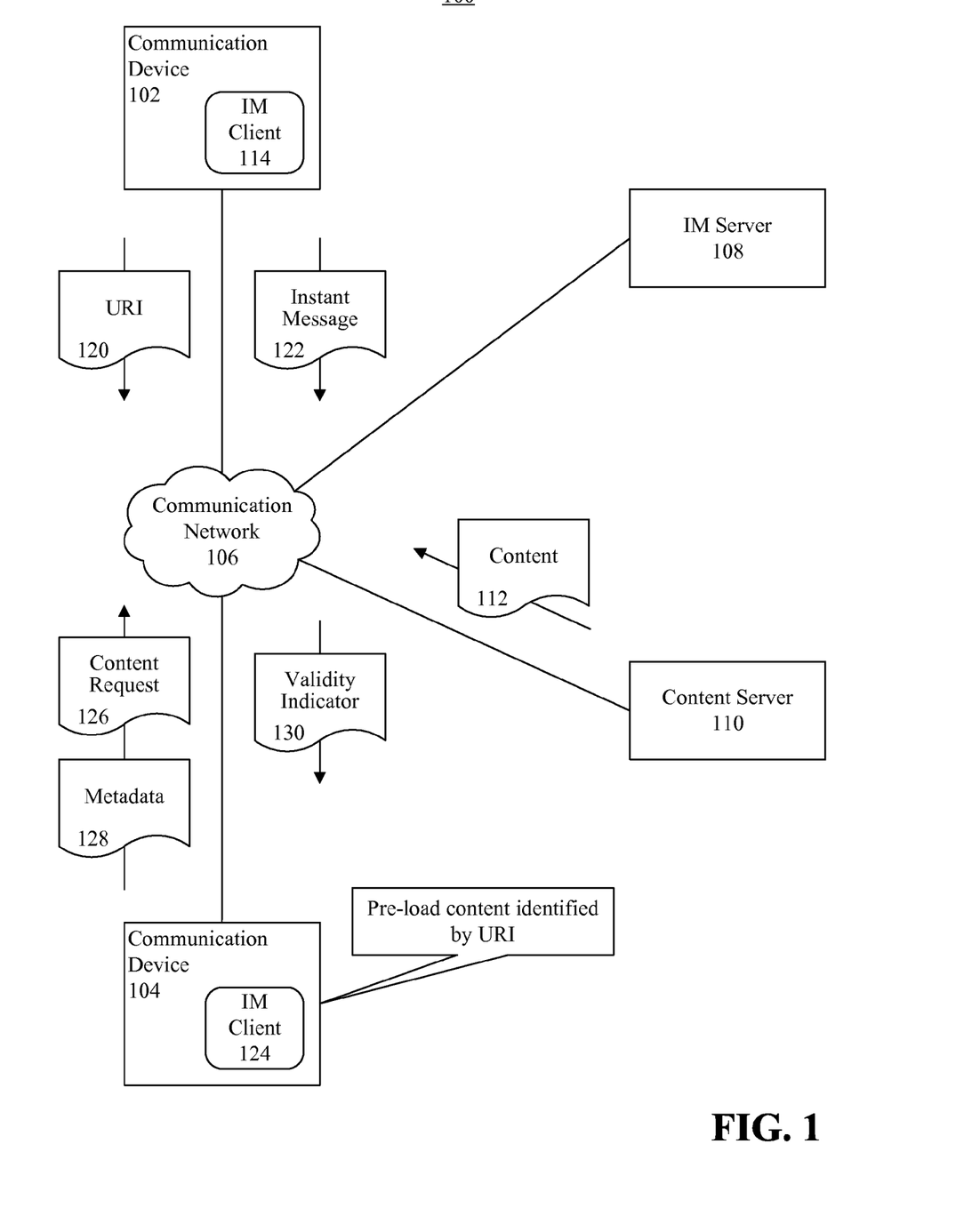
FIG. 1 is a block diagram illustrating a system for rendering content identified by a uniform resource identifier (URI) in accordance with one embodiment of the present invention.

FIG. 1 is a block diagram illustrating a system 100 for rendering content identified by a URI in accordance with one embodiment of the present invention. The system can include at least a communication device 102 and a communication device 104 communicatively linked via a communication network 106. Other communication devices (not shown) also can be communicatively linked to the communication device 102 and/or the communication device 104 via the communication network 106. In this regard, the communication devices can be communicatively linked via the communication network 106 to exchange one or more instant messages.

The communication network 106 can include a WAN, such as the Internet, a LAN, a cellular communication network, and/or any other communication networks over which instant messages and/or other data can be communicated. The communication devices 102, 104 can be computers, mobile computers, tablet computers, mobile stations (e.g., mobile telephones), personal digital assistants (PDAs), or any other devices that may communicate using IM.

The system 100 also can include an IM server 108 and a content server 110. The IM server 108 and the content server 110 can be communicatively linked to the communication device 102 and/or the communication device 104 (and other communication devices not shown) via the communication network 106. The IM server 108 can manage instant messages communicated between at least the communication device 102 and the communication device 104. The IM server 108 can be communicatively linked to the communication device 102 and the communication device 104 via the communication network 106. The content server 110 can provide content 112 to the communication device 102 and/or the communication device 104 via the communication network 106. Such content 112 can be, for example, media (e.g., audio, video, text and/or any combination of audio, video and/or text media) or any other data that may be communicated over the communication network 106. In one embodiment, the content 112 can include data from files or a database, though this need not be the case.

In operation, during an IM session, via the IM client 114 a user of the communication device 102 can enter a URI 120 into an instant message 122 during an IM session via an IM client 114 executed by the communication device 102. For example, the URI 120 can be entered by the user into the instant message 122 as text input into the instant message 122. In this regard, the instant message 122 can be an instant message 122 generated within, or otherwise associated with, the IM session. When the URI 120 is entered, the URI 120 can be communicated to an IM client 124 executing by the communication device 104, for example via the IM server 108. If additional communication devices (not shown) are participating in the IM session, the URI 120 also can be communicated to IM clients executing on such communication devices.

Notably, the URI 120 can be sent prior to the instant message 122 being sent. For example, the IM client 114 can detect the URI 120 being entered into the instant message 122, and automatically communicate the URI 120 to the IM client 124 of the communication device 104 and/or clients of other communication devices participating in the IM session. The URI 120 can be communicated in a message that remains hidden from the user of the communication device 104 and/or users of other communication devices, at least until the instant message 122 comprising the URI 120 is received from the communication device 102. In illustration, the URI 120 can be communicated from the IM client 114 to the client 124 in a message that is not presented to the user of the communication device 104 and/or other communication devices participating in the IM session.

In response to the URI 120 being received, the IM client 124 can attempt to download the content 112 associated with the URI 120 from the content server 110. For example, the URI 120 can correspond to content 112 stored by the content server 110, and the content 112 can be automatically downloaded from the content server 110 to the communication device 104 when the URI 120 is received by the IM client 124. The content 112 can be preloaded to memory within the communication device 104, or memory otherwise accessible to the communication device 104. As used herein, the term "preload" means to load data within memory and make such data available when the data is requested, for example by an IM client or a user of the IM client.

In illustration, the IM client 124 executed by the communication device 104 can receive the URI 120 and, in response to receiving the URI 120, the IM client 124 can communicate a content request 126 to the content server 110 identified by the URI 120. In response to the content request 126, the content server 110 can communicate the content 112 to the IM client 124. The IM client 124 can store the content 112 within memory of the communication device 104, or memory to which the communication device 104 is communicatively linked. In one aspect of the present invention, the content 112 can remain hidden from a user of the communication device 104 at least until the instant message 122 containing the URI 120 is received by the communication device 104 and/or until a user of the communication device 104 selects the URI 120 within the instant message 122.

When the instant message 122 is communicated from the communication device 102 and is received by the communication device 104, the instant message 122 can be presented by the communication device 104, for example in a view of the IM client 124, and the URI 120 can be presented in the instant message 122.

In one arrangement, the content 122 from the content source (e.g., on the content server 110) identified by the URI 120 can be presented by the communication device 104 when the instant message 122 is received by the client 124. For example, when the instant message 122 is received, the IM client 124 can retrieve the preloaded content 112 from the memory of the communication device 104, or other memory communicatively linked to the communication device 104 in which the communication device 104 preloaded the content 112, and the communication device 104 can present the content 112 in a suitable manner. In another arrangement, when the instant message 122 is received by the IM client 124, the communication device 104 can present the instant message 122 to the user, for example within a view presented within the IM client 124. When the user selects the URI 120 within the instant message 122, the communication device 104 can be present the content 112 to the user in a suitable manner.

Regardless of when the content 112 is presented, the content can presented within a view of the client 124, or within a view of another application executed by the communication device 104. For example, if the content 112 is application specific, for instance the content 112 is a word processing document, the content 112 can be presented in an application that normally presents word processing documents, such as a word processor. Similarly, if the content 112 is audio/video content, the content 112 can be presented in an application that normally presents audio/video content. If the content 112 is a spreadsheet, the content 112 can be presented in an application that normally presents a spreadsheet. If the content 112 is content from a database, the content 112 can be presented in an application that normally presents database content.

Notwithstanding, web browsers commonly include plug-ins that enable web browsers to present any of a variety of different content, and the content 112 can be presented in a web browser. Still, the invention is not limited in this regard. For example, the IM client 124 can be configured (e.g., via one or more plug-ins) to present the content 112, and the content can be presented within a view of the IM client 124. Moreover, one or more other applications also may be configured to present the content 112. Further, the communication device 104 can cause the content 112 to be presented on the communication device and/or via an external device communicatively linked to the communication device 104 (e.g. an external display, an external audio system, etc.). In this regard, content presented on such external devices is considered herein to be presented by the communication device 104. Nonetheless, the present invention is not limited as to the manner in which the content 112 is presented by the communication device 104.

In response to the content 112 being presented by the communication device 104, the IM client 124 can communicate metadata 128 to the IM client 114 indicating that the content 112 was accessed by a user of the communication device 104. In response to receiving the metadata 128, the IM client 114 can present a message to a user of the communication device 102, for example within the client 114, indicating that the content 112 was accessed by a user of the communication device 104.

In some instances, the URI 120 may be an invalid link. In response to the content request 126, the IM client 124 can receive a validity indicator 130 that indicates whether the URI 120 refers to a valid link. Alternatively, the IM server 108 can receive the validity indicator 130. If the validity indicator 130 indicates that the URI 120 does not correspond to a valid link, the IM client 124 and/or the IM server 108 can identify the URI 120 within the instant message 122 as being an invalid link, for example when the instant message 122 is presented by the communication device 104 to a user. Further, the IM client 124, or the IM server 108, can communicate to the IM client 114 the metadata 128, which can indicate whether the URI 120 is a valid link. For example, if the URI 120 is invalid, the metadata 128 can indicate such. In response to receiving the metadata 128, if the metadata 128 indicates that the URI 120 is an invalid link, the IM client 114 can present via the communication device 102, or an external device communicatively linked to the communication device 102, an indication that the URI 120 is an invalid link. For instance, IM client 114 can present to a user of the communication device 102 an indication within a view of the IM client 114 that the URI 120 is an invalid link.

In another arrangement, the IM client 114, the communication device 102, and/or the IM server 108 can determine whether the URI is a valid link prior to communicating the instant message 122. For example, when the content 112 is not available from the content source (e.g., on the content server 110) identified by the URI 120, the URI 120 can be identified as an invalid link. In such case, within the instant message 122, the URI 120 can be identified as being an invalid link.

In another embodiment of the present invention, the content 112 can be deleted, or otherwise removed, from the memory in which the content 112 is preloaded at the behest of a user request while the IM session is currently active, at the behest of a user request after the IM session is closed, automatically when the user logs off of the IM session, or automatically when the IM session is closed.

In another aspect of the present invention, the content 112 can be saved so as to be retrievable at any desired time. In one embodiment, the content 112 can be saved as part of a chat transcript. In illustration, the content 112 can be retained within the memory and a link to the content 112 can be added to the transcript. In another arrangement, the content 112 can be moved from a temporary storage space within the memory to a permanent storage space within the memory and associated with the chat transcript, for example via a link (e.g., a hyperlink). The memory can include multiple storage devices, and thus moving the content 112 can include moving the content 112 from one storage device to another, for example from RAM to a MID or SSD, or from one storage location on a HHD or SSD to another storage location on the HHD or SSD.

In another arrangement, the content 112 can be added to the chat transcript. In one aspect, an algorithm can be applied to determine whether to add the content 112 to the chat transcript or to provide within the chat transcript a link (e.g., a hyperlink) to the content 112. For example, if the size of the data for the content 112 exceeds a certain threshold, the link to the content 112 can be provided within the chat transcript. If, however, the size of the data for the content 112 does not exceed the certain threshold, the content 112 can be added to the chat transcript.

Further, a user of the communication device 104, or a user of another device communicatively linked to the communication device 104, can request to archive the content 112. In response to receiving a user request to archive the content, the content 112 can be archived to a content archive. For example, the content 112 can be archived to a content archive directory contained on a HHD or SSD.

In one aspect of the present invention, the IM client 124, or another application executed by the communication device 104, can monitor memory resources allocated to storing, at least temporarily, the content 112, and/or any other content associated with IM sessions. For example, the percentage of memory resources being utilized to store the content 112, other content associated with the MI session in which the URI 120 was communicated, and/or other content associated with other IM sessions, can be monitored and presented to the user of the communication device 104. Via the communication device 104, or another device communicatively linked to the communication device 104, the user can be provided an option to selectively delete, or otherwise remove, the content 112 or the other content. In illustration, a list of content presently stored by the communication device 104 can be presented to the user via a particular view, and the user can select one or more instances of content to delete or otherwise remove from the memory in which the content is preloaded and/or archived.

In one embodiment of the present invention, one or more applicable rules can be applied to determine whether the URI 120 is to be communicated to the communication device 104 and/or to determine whether a user of the communication device 104 is allowed to access the content 112 associated with the URI 120. In illustration, prior to receiving the user input into the IM client 124 selecting the URI 120, a determination can be made as to whether the content 112 satisfies an applicable rule(s). Such determination can be made when the URI 120 is entered into the instant message 122 by a user of the communication device 102, or when the instant message 122 is received by the communication device 104. In this regard, the determination can be made by the IM client 114, the IM client 124, the IM server 108, or another application executing on, or communicatively linked to, the communication device 102, the communication device 104 and/or the IM server 108. When the content 112 satisfies the applicable rule(s), the communication device 104 (e.g., via the IM client 124) can be authorized to receive the content 112 and preload the content 112 into the memory. When the content 112 does not satisfy the applicable rule(s), the communication device 104 can be prevented from receiving the content 112 and/or preloading the content 112 into the memory.

Similarly, the one or more applicable rules can be applied to determine whether a user of the communication device 102, a user of the communication device 104, a location of the communication device 102, a location of the communication device 104 and/or a characteristic of the URI 120 satisfies one or more applicable rules that define whether the content 112 may be preloaded by the communication device 104. When the applicable rule(s) are satisfied, the communication device 104 (e.g., via the IM client 124) can be authorized to receive the content 112 and preload the content 112 into the memory. Again, when the applicable rule(s) are not satisfied, the communication device 104 can be prevented from receiving the content 112 and/or preloading the content 112 into the memory.

For simplicity, the processes described herein have been described with respect to a URI 120 and an instant message 122 communicated from the communication device 102 to the communication device 104. However, as those skilled in the art will appreciate, instant messages can be simultaneously communicated to a plurality of IM clients. The processes described herein can be applied to any other communication device/IM client receiving the URI 120 and/or instant message 122 from the IM client 114 of the communication device 102.

Figure 2:
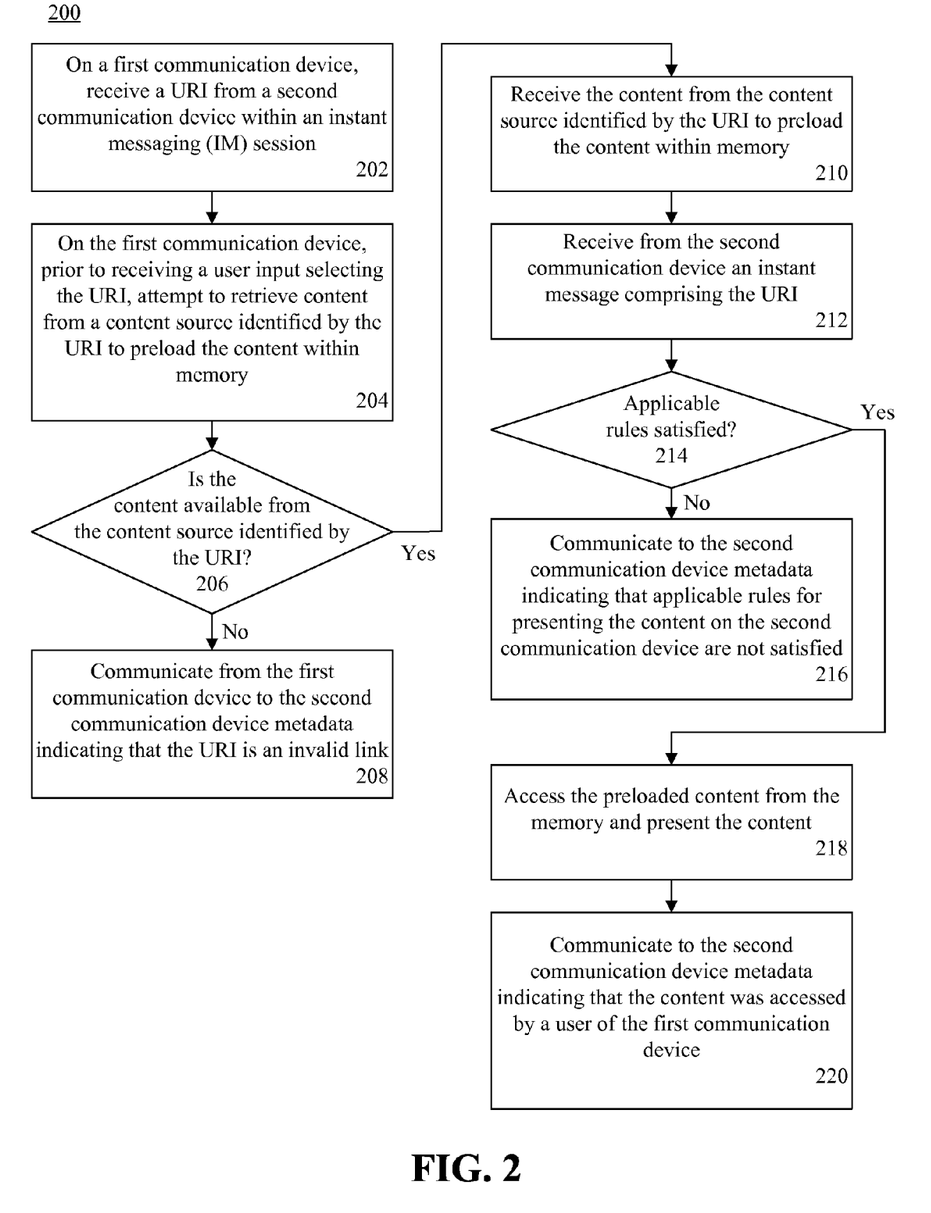
FIG. 2 is a flow chart illustrating a method of rendering con identified by a URI in accordance with another embodiment of the present invention.

FIG. 2 is a flow chart illustrating a method 200 of rendering content identified by a uniform resource identifier (URI) in accordance with another embodiment of the present invention. At step 202, on a first communication device, a URI from a second communication device can be received within an instant messaging (IM) session. At step 204, on the first communication device, prior to receiving a user input selecting the URI, an attempt can be made to retrieve content from a content source identified by the URI to preload the content within the memory of the first communication device or memory otherwise accessible to the first communication device. Step 204 can be performed via a processor on the first communication device or another processor to which the first communication device is communicatively linked.

At decision box 206, a determination can be made as to whether the content is available from a content source identified by the URI. If the content is not available, at step 208 the first communication device can communicate to the second communication device metadata indicating that the URI is an invalid link. If the content is available, at step 210 the content can be received from the content source identified by the URI. The content can be preloaded within the memory of the communication device or another memory communicatively linked to the communication device.

At step 212, an instant message comprising the URI can be received by the first communication device from the second communication device. At decision box 214, a determination can be made as to whether applicable rules are satisfied, for example as previously described. The decision made by decision box 214 need not be performed after decision box 206. For example, the decision process performed at decision box 214 can be made before decision box 206. Moreover, such decision can be, but need not be, performed by the first communication device. For example, such decision can be performed by an IM server.

If the applicable rules are not satisfied, at step 216 metadata can be communicated to the second communication device indicating that the applicable rules for presenting the content on the second communication device are not satisfied. Such metadata can be communicated via the first communication device or the IM server.

If the applicable rules are satisfied, at step 218 the preloaded content can be accessed from the memory and the preloaded content can be presented by the first communication device. At step 220 metadata indicating that the content was accessed by a user of the first communication device can be communicated to the second communication device. Again, such metadata can be communicated via the first communication device or the IM server.

Figure 3:
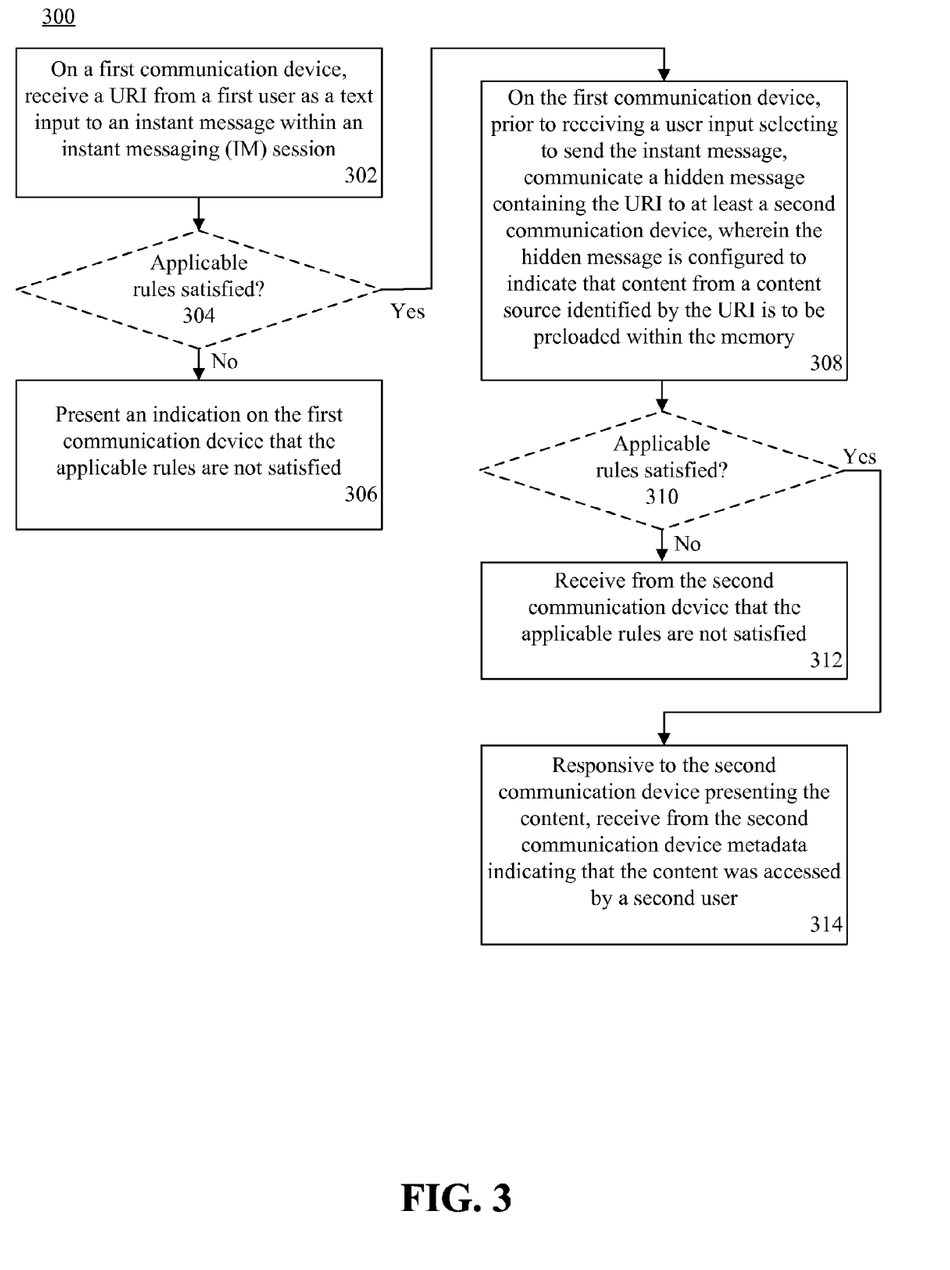
FIG. 3 is a flow chart illustrating a method of rendering content identified by a URI in accordance with another embodiment of the present invention.

FIG. 3 is a flow chart illustrating a method 300 of rendering content identified by a uniform resource identifier (URI) in accordance with another embodiment of the present invention. At step 302, on a first communication device, a URI from a first user can be received as a text input to an instant message within an instant messaging (IM) session. Step 302 can be performed via a processor on the first communication device or another processor to which the first communication device is communicatively linked.

Referring to decision box 304, optionally, a determination can be made as to whether applicable rules are satisfied, for example as previously described. If the applicable rules are not satisfied, at step 306 an indication can be presented on the first communication device, for example within the IM session, indicating that the applicable rules are not satisfied. For instance, the message can indicate that the URI does not conform to established rules. Such indication can be presented in the instant message, in a pop-up window provided by the IM client on the first communication device, or in another suitable manner.

At step 308, on the first communication device, prior to receiving a user input selecting to send the instant message, a hidden message containing the URI can be communicated to at least a second communication device, wherein the hidden message is configured to indicate that content front a content source identified by the URI is to be preloaded within memory associated with the second communication device. The memory can be memory of the second communication device or memory to which the communication device is otherwise communicatively linked.

Optionally, at decision box 310, a determination can be made as to whether applicable rules are satisfied, for example as previously described. Such determination can be made by the second communication device or the server. The decision box 310 can be implemented in addition to, or in lieu of, decision box 304. If the applicable rules are not satisfied, at step 312 an indication can be received from the second communication device, or the IM server, that the applicable rules are not satisfied. For instance, the message can indicate that the URI does not conform to established rules. If, however, the applicable rules are satisfied, at step 314, responsive to the second communication device presenting the content, metadata indicating that the content was accessed by a second user can be received from the second communication device.

Figure 4:
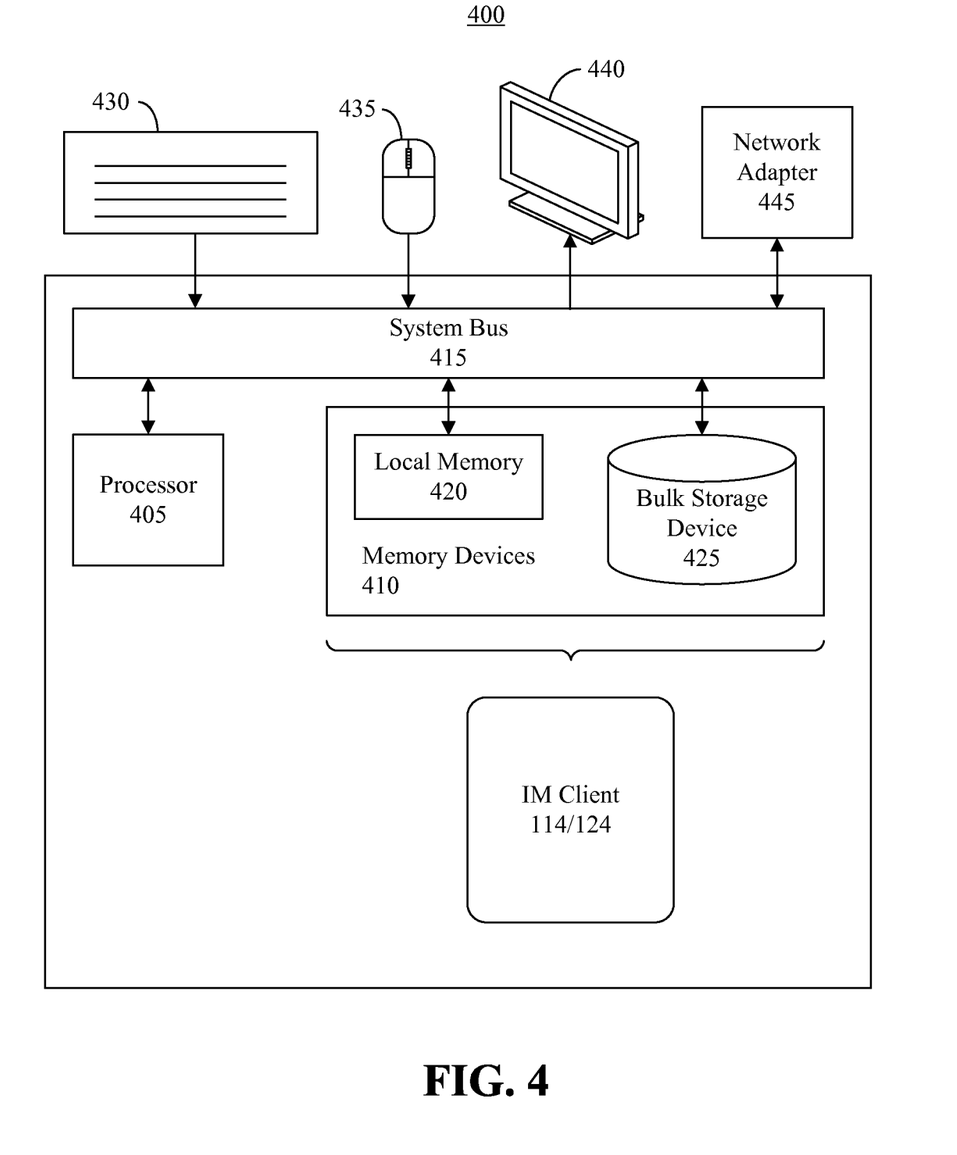
FIG. 4 is a communication device in accordance with another embodiment of the present invention.

FIG. 4 is a communication device 400 in accordance with another embodiment of the present invention. The communication device 400 is an example of a communication device that may be used for the communication device 102 and/or the communication device 104 of FIG. 1.

The communication device 400 can include at least one processor 405 coupled to memory elements 410 through a system bus 415. As such, the communication device 400 can store program code within memory elements 410. The processor 405 can execute the program code accessed from the memory elements 410 via the system bus 415. In one aspect, for example, the communication device 400 can be implemented as computer or other communication device that is suitable for storing and/or executing program code related to instant messaging. It should be appreciated, however, that communication device 400 can be implemented in the form of any system or systems comprising at least one processor and memory that is capable of performing the functions described within this specification. For example, as noted, the communication devices 400 can be a computer, a mobile computer, a tablet computer, a mobile station (e.g., mobile telephone), a tablet computer, a PDA, or any other device that may communicate using IM.

The memory elements 410 can include one or more physical memory devices such as, for example, local memory 420 and one or more bulk storage devices 425. Local memory 420 refers to RAM or other non-persistent memory device(s) generally used during actual execution of the program code. Bulk storage device(s) 425 can be implemented as one or more storage devices, examples of which include, but are not limited to, HDDs, SSDs, or other persistent data storage devices. The communication device 400 also can include one or more cache memories (not shown) that provide temporary storage of at least some program code in order to reduce the number of times program code must be retrieved from bulk storage device 425 during execution.

Input/output (I/O) devices such as keyboard 430, a pointing device 435, a display 440 and a network adapter 445 also can be coupled to the communication device 400. The I/O devices can be coupled to the communication device 400 either directly or through intervening I/O controllers. The keyboard 430, pointing device 435, and/or display 440 can receive user inputs into the communication device 400 and present to the user information generated by the communication device 400. The network adapter 445 can be coupled to the communication device 400 to enable the communication device 400 to become coupled to other systems, computer systems, and/or remote storage devices through intervening private or public networks. Modems, cable modems, and Ethernet cards are examples of different types of network adapters that can be used with communication device 400.

As pictured in FIG. 4, the memory elements 410 can store the IM client 114 or the IM client 124, depending on whether the communication device 400 represents the communication device 102 or the communication device 104 of FIG. 1. The IM client 114/124 can be executed by the processor 405, or the processor 405 and one or more other processors, to implement the processes and methods described herein.

Like numbers have been used in this specification to refer to the same items throughout this specification. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustrations, and combinations of blocks in the block diagrams and/or flowcharts illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more, other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Within a first communication device comprising a processor and a memory, a method of rendering content identified by a uniform resource identifier (URI), the method comprising:
   on the first communication device, receiving the URI in a hidden message within an instant messaging (IM) session, the URI received prior to an instant message in which the URI is entered being sent by a user of a second communication device who is generating the instant message; and
   prior to receiving a user input selecting the URI and prior to the instant message in which the URI is entered being received, via the processor, attempting to retrieve content from a content source identified by the URI to preload the content within the memory.

2. The method of claim 1, further comprising:
   prior to receiving a user input selecting the URI, via the processor, receiving the content from the content source identified by the URI to preload the content within the memory.

3. The method of claim 2, wherein the content preloaded within the memory of the first communication device remains hidden from a user of the first communication device at least until an instant message comprising the URI is received.

4. The method of claim 2, wherein the content preloaded within the memory of the first communication device remains hidden from a user of the first communication device until an instant message comprising the URI is received and the user selects the URI within the instant message.

5. The method of claim 2, further comprising:
   receiving an instant message comprising the URI;
   receiving the user input selecting the URI;
   responsive to receiving the user input selecting the URI, accessing the content from the memory; and
   presenting on the first communication device the content accessed from the memory.

6. The method of claim 5, further comprising:
   communicating from the first communication device to the second communication device, from which the instant message is received, metadata indicating that the content was accessed by a user of the first communication device.

7. The method of claim 2, further comprising:
   receiving an instant message comprising the URI; and
   when the instant message is received:
      accessing the content from the memory; and
      presenting on the first communication device the content accessed from the memory.

8. The method of claim 2, further comprising:
   deleting the content from the memory when the user logs off of the IM session or when the IM session is closed.

9. The method of claim 2, further comprising:
   saving the content as part of a chat transcript.

10. The method of claim 2, further comprising:
    receiving a user request to archive the content; and
    responsive to the user request, archiving the content to a content archive.

11. The method of claim 1, further comprising:
    prior to receiving the user input selecting the URI, via the processor, determining whether the content from the content source identified by the URI satisfies an applicable rule; and
    when the content satisfies the applicable rule, receiving the content from the content source identified by the URI to preload the content within the memory.

12. The method of claim 1, further comprising:
    prior to receiving the user input selecting the URI, via the processor, determining whether a user of the first communication device, a user of a second communication device from which the instant message is received, a location of the first communication device, a location of the second communication device, or a characteristic of the URI satisfies an applicable rule; and
    when the applicable rule is satisfied, receiving the content from the content source identified by the URI to preload the content within the memory.

13. The method of claim 1, further comprising:
    determining whether the content is available from the content source identified by the URI; and
    when the content is not available from the content source identified by the URI, identifying the URI as an invalid link;
    receiving an instant message comprising the URI; and
    within the instant message, identifying that the URI is an invalid link.

14. The method of claim 13, further comprising:
    communicating from the first communication device to a second communication device, from which the instant message is received, metadata indicating that the URI is an invalid link.

15. Within a first communication device comprising a processor and a memory, a method comprising:
    on the first communication device, receiving a URI from a first user as a text input to an instant message within an instant messaging (IM) session;
    prior to receiving a user input selecting to send the instant message, via the processor, communicating a hidden message containing the URI from the first communication device to at least a second communication device, wherein the hidden message is configured to indicate to the second communication device that content from a content source identified by the URI is to be preloaded within a memory of the second communication device prior to the instant message in which the URI is entered being received by the second communication device.

16. The method of claim 15, further comprising:
responsive to the second communication device presenting the content, the first communication device receiving from the second communication device metadata indicating that the content was accessed by a second user.

17. The method of claim 15, further comprising:
responsive to the second communication device determining that content not available from the content source identified by the URI, the first communication device receiving metadata indicating that the URI is an invalid link.

18. The method of claim 15, further comprising:
determining whether the content from the content source identified by the URI satisfies an applicable rule;
wherein communicating the hidden message containing the URI to at least the second communication device is responsive to determining that the content satisfies the applicable rule.

19. The method of claim 15, further comprising:
determining whether a user of the first communication device, a user of the second communication device, a location of the first communication device, a location of the second communication device, or a characteristic of the URI satisfies an applicable rule; and
wherein communicating the hidden message containing the URI to at least the second communication device is responsive to determining that the applicable rule is satisfied.

20. A computer program product comprising:
a computer-readable memory having stored thereon computer-readable program code that, when executed by a system comprising a processor and a memory, renders content identified by a uniform resource identifier (URI), the computer-readable memory comprising:
computer-readable program code that on a communication device, receives the URI in a hidden message within an instant messaging (IM) session, the URI received prior to an instant message in which the URI is entered being sent by a user of a second communication device who is generating the instant message; and
computer-readable program code that, prior to receiving a user input selecting the URI and prior to the instant message in which the URI is entered being received, attempts to retrieve content from a content source identified by the URI to preload the content within the memory.

21. The computer program product of claim 20, wherein the computer-readable memory further comprises:
computer-readable program code that receives the content from the content source identified by the URI, prior to receiving a user input selecting the URI, to preload the content within the memory.

22. A computer program product comprising:
a computer-readable memory having stored thereon computer-readable program code that, when executed by a system comprising a processor and a memory, communicates a uniform resource identifier (URI), the computer-readable memory comprising:
computer-readable program code that on a first communication device, receives the URI from a first user as a text input to an instant message within an instant messaging (IM) session; and
computer-readable program code that, prior to receiving a user input selecting to send the instant message, communicates a hidden message containing the URI to at least a second communication device, wherein the hidden message is configured to indicate to the second communication device that content from a content source identified by the URI is to be preloaded within a memory of the second communication device prior to the instant message in which the URI is entered being received by the second communication device.

23. The computer program product of claim 22, wherein the computer-readable memory further comprises:
computer-readable program code that on the first communication device, responsive to the second communication device presenting the content, receives from the second communication device metadata indicating that the content was accessed by a second user.

* * * * *